Dec. 31, 1929.   G. A. MUTCH   1,741,645

WATER SOFTENER

Filed May 16, 1929

Inventor

George A. Mutch,

By Clarence A. O'Brien
Attorney

Patented Dec. 31, 1929

1,741,645

UNITED STATES PATENT OFFICE

GEORGE ALEX MUTCH, OF CORAL GABLES, FLORIDA, ASSIGNOR TO NEW-H-MAN CORPORATION, OF MIAMI, FLORIDA

WATER SOFTENER

Application filed May 16, 1929. Serial No. 363,556.

This invention relates to new and useful improvements in water softeners and has more particular reference to an apparatus of this nature especially adapted for household use.

The principal object of the invention is to provide a water softener which in operation will soften water in a much less period of time than is possible with water softeners now in use.

Another important object of the invention is to provide an apparatus of the character mentioned which can be easily flushed, cleaned and repaired, without difficulty.

These and numerous other important objects of the invention will become more apparent to the reader after considering the invention as described and claimed hereinafter.

Figure 1:
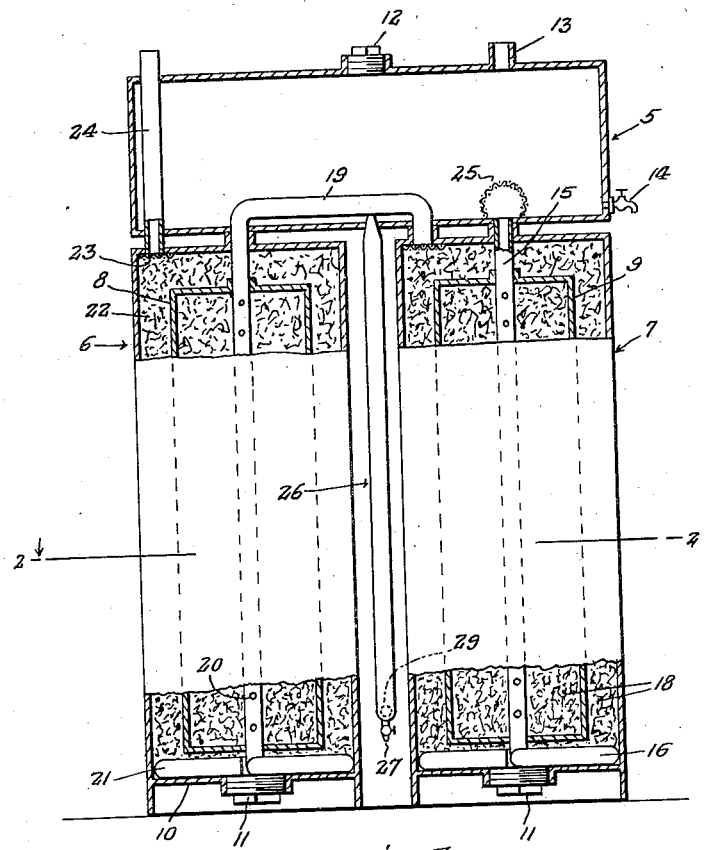
Figure 1 represents a partial vertical sectional view through the improved apparatus.
Figure 2:
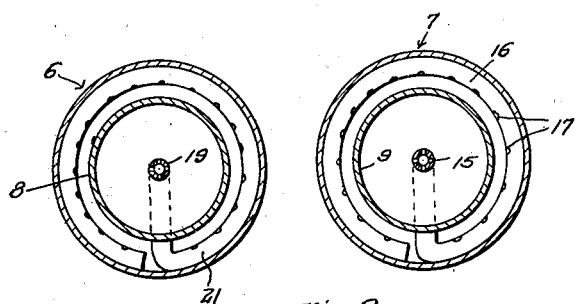
Figure 2 represents a horizontal sectional view, taken substantially on the line 2—2 of Figure 1, looking downwardly.
Figure 3:
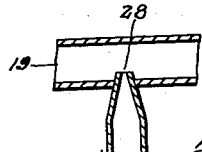
Figure 3 represents a fragmentary vertical sectional view of the connection between the gauge and the connecting pipe between the tanks.

Referring to the drawings, wherein like numerals designate like parts, it will be seen that the present invention includes a reservoir generally referred to by numeral 5, for containing a supply of brine or salt and water, while numerals 6 and 7 refer generally to vertically disposed tanks, within which are spacedly mounted tanks 8 and 9, respectively. The inner tanks 8 and 9 may be maintained in spaced relation with respect to the exterior tanks 6 and 7 respectively by any suitable means found practical. The exterior tanks 6 and 7 are each provided with an elevated bottom 10 having a central opening within which is normally engaged a threaded plug 11, which can be removed to permit the displacement of the mineral contents of the tank.

It will thus be seen that a supply of brine or salt may be placed into the tank 5, by the removal of the plug 12, and after replacing the plug 12, a supply of water may be discharged into the reservoir through the filler neck 13. A suitable drain 14 is provided, whereby the reservoir may be drained when desired. The reservoir 5 is provided with an outlet pipe 15 which extends vertically through the tank 7 and through the tank 9, in the manner clearly shown in Figure 1. The lower portion of the pipe 15 is bent at its lower end to provide a horizontally disposed convolution 16 and as shown the vertical portion of the pipe as well as the convolution 16 have spaced perforations 17 therein, through which the solution of the tank 5 may spray and pass into the mineral substance 18 contained in the tanks 7 and 9. The solution passing from the tank 9 downwardly to the bottom of the tank 7 and the solution passing outwardly from the convoluted portion 16 will pass upwardly between the vertical walls of the tanks 7 and 9 and into the connecting pipe 19 communicating the pipe 7 with tanks 6 and 8. The pipe 19 depends vertically through the tanks 6 and 8 and this portion of the pipe is provided with perforations denoted by numeral 20. The lower portion of this pipe 19 is also provided with a perforated convolution 21, from which the solution will spray and pass upwardly between the vertical walls of the tanks 6 and 8. The liquid passing upwardly through the mineral 22 will receive its final clarification before it passes through the screen 23 to the outlet pipe 24. A globular screen 25 is provided at the inlet end of the pipe 15 to prevent large particles of brine or salt from passing into the same.

The gauge generally referred to by numeral 26 is provided with a pet cock 27 at its lower end and is preferably constructed of some transparent material. The upper end of the gauge is constricted as at 28 and projects into the connecting pipe 19. It will thus be seen that when the liquid passes from the tank 7 into the tank 6, some of the liquid will seep through the constricted end 28 and drop by drop the level of the liquid in the gauge will rise and raise the float 29.

Obviously the amount of liquid passing through the apparatus may be determined by the position of the float 29 within the gauge 26.

While the foregoing description has been in detail, it is to be understood that numerous changes in the specific shape, size and materials may be resorted to, without departing from the spirit or scope of the invention as claimed hereinafter.

What is claimed as new is:

1. A water softener comprising a solution reservoir, a receiving tank, and a perforated pipe leading from the reservoir and having its discharge within the receiving tank, the lower end of said pipe being convoluted and provided with perforations, and a second receiving tank in communication with the first mentioned tank, and a communicating pipe extending from the first mentioned tank to the second mentioned tank, and a gauge tube depending from said connecting pipe and provided with a communicating member therein, the upper end of said tube being constricted to permit a slow seepage of the solution into the gauge tube, so as to raise the indicating member in proportion to the amount of solution passing through the connecting pipe.

2. A water softener comprising a solution reservoir, a receiving tank, a perforated pipe leading from the reservoir and having its discharge end within the receiving tank, a baffle surrounding the perforated pipe and being in spaced relation thereto, the lower end of the said pipe being convoluted and provided with perforations, said convolutions being of a diameter greater than the diameter of the baffle.

In testimony whereof I affix my signature.

GEORGE ALEX MUTCH.